United States Patent [19]

Junker

[11] Patent Number: 4,809,466

[45] Date of Patent: Mar. 7, 1989

[54] METHOD FOR THE HIGH-SPEED PRECISION CLAMPING OF ROTATIONALLY SYMMETRICAL WORKPIECES AND HIGH-SPEED PRECISION CLAMPING DEVICE FOR IMPLEMENTING THE METHOD

[76] Inventor: Erwin Junker, Talstrasse 78, 7611 Nordrach-Baden, Fed. Rep. of Germany

[21] Appl. No.: 883,889

[22] Filed: Jul. 9, 1986

[30] Foreign Application Priority Data

Jul. 24, 1985 [DE] Fed. Rep. of Germany ....... 3526539

[51] Int. Cl.⁴ .............................................. B25B 5/00
[52] U.S. Cl. .................. 51/237 R; 51/217 T; 29/559
[58] Field of Search ............ 51/237, 236, 217 R, 51/217 T, 238 S; 29/559; 279/16, 17, 120, 66; 269/902, 25, 34, 254 CS, 254 R

[56] References Cited

U.S. PATENT DOCUMENTS

| 608,449 | 8/1898 | Gauthier | 279/120 |
| 2,403,599 | 7/1946 | Hohwart et al. | 51/237 R |
| 4,406,090 | 9/1983 | Schian et al. | 51/236 |
| 4,709,512 | 12/1987 | Okubo | 51/237 R |

Primary Examiner—Frederick R. Schmidt
Assistant Examiner—Robert A. Rose
Attorney, Agent, or Firm—Jordon and Hamburg

[57] ABSTRACT

A method of clamping rotationally symmetrical workpieces for their circumferences to be ground, whereby the radial positioning, the clamping and the axial positioning of the workpiece are effected independently of one another, so that the positioning operation is not affected by the clamping operation and is accurately maintained. In addition, a clamping device for implementing the method includes a first member which radially positions the workpiece, a second member which clamps the workpiece for transferring torque, and a third member which axially positions the workpiece.

4 Claims, 4 Drawing Sheets

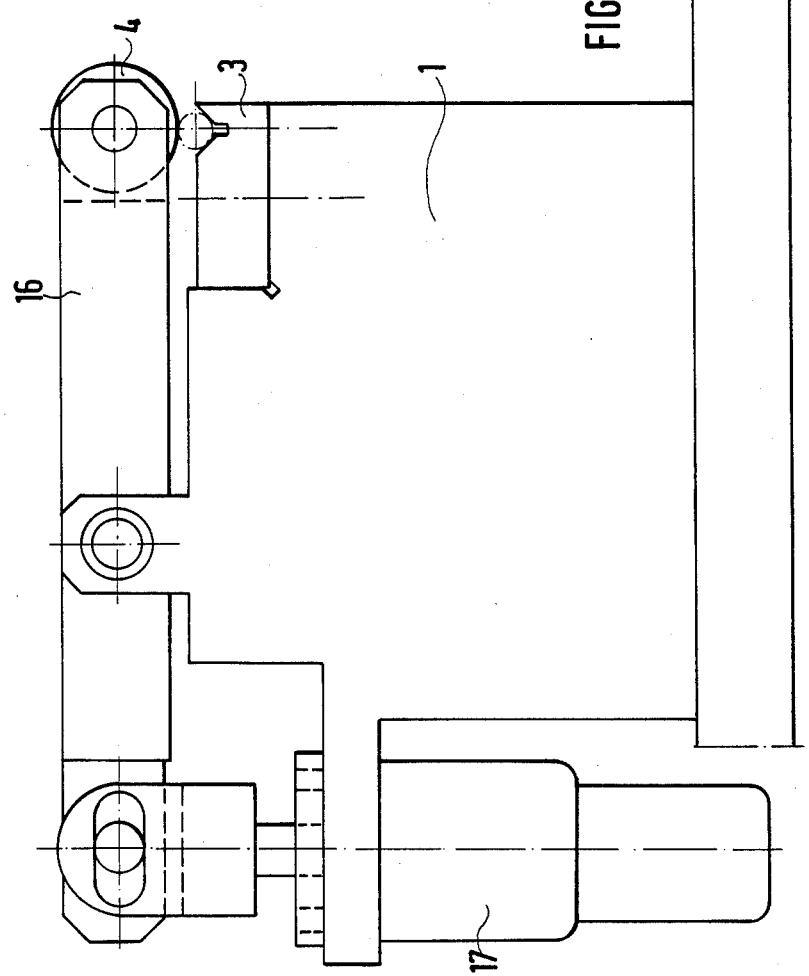

METHOD FOR THE HIGH-SPEED PRECISION CLAMPING OF ROTATIONALLY SYMMETRICAL WORKPIECES AND HIGH-SPEED PRECISION CLAMPING DEVICE FOR IMPLEMENTING THE METHOD

BACKGROUND OF THE INVENTION

The invention relates to a method for the high-speed precision clamping of a rotationally symmetrical workpiece for its outside circumference to be ground, utilising a clamping device for the axial and radial positioning of the workpiece, for clamping the workpiece in its processing position and for transferring the torque from the driving spindle head to the positioned and clamped workpiece. The invention also relates to a high-speed precision clamping device for clamping a rotationally symmetrical workpiece for its outside circumference to be ground, in accordance with the above-mentioned method. The invention thereby provides such an improvement in the clamping method and in the clamping device used therefor that a hitherto unattained accuracy is achieved for the positioning of the workpiece associated with the clamping operation and is maintained during processing of the workpiece.

Clamping methods and clamping devices for rotationally symmetrical workpieces, which have to be rotated past the tool whilst their outside circumferences are being ground, have been known for a long time. The same is also true of workpieces which are processed by grinding the outside circumference. Generally, such workpieces are clamped in a three-jaw chuck which is located on the driving spindle head and wherein the three clmaping jaws, which are directed towards the axis of rotation, radially and axially position the workpiece in a single combined positioning and clamping process and thereby clamp the workpiece so securely that the driving torque is transferred from the driving spindle to the workpiece. This known type of clamping method can keep within manufacturing tolerances which are sufficient for most of the usual manufacturing tasks. More recently, however, according to the standards set by modern techniques for grinding outside circumferences, narrower manufacturing tolerances are demanded and, consequently, the manufacturing waste—which occurs due to tolerances being exceeded—increases and makes manufacture more expensive.

SUMMARY OF THE INVENTION

A basic object of the invention is to provide a positioning and clamping method which permits narrower manufacturing tolerances, thereby keeping manufacturing waste low and preventing further increases in the manufacuring cost.

In a method of the above-described type, the object is achieved, in accordance with the invention, in that the workpiece is initially radially positioned in a first device member which is secured to a frame, in that the radially positioned workpiece is then clamped in a second device member which is displaceably and rotatably mounted and transfers torque, and in that the radially positioned and clamped workpiece is finally axially positioned by axial displacement as far as a stop member on a third device member which is secured to the frame. This arrangement permits the method steps of positioning and clamping to be very largely separate from one another, so that the reaction forces occurring during clamping and during transfer of the rotary force no longer also act upon and change the positioning operation, and increase the positioning tolerances due to wear in the positioning region. The consequence is that the workpieces may be processed with narrower tolerances and that, at the same time, the manufacturing waste caused by tolerances being exceeded is reduced. Consequently, the invention permits a considerable increase in quality to be achieved at a reduced manufacturing cost. Practical experiments have shown that, with the invention, radial and axial tolerances can easily be kept within the lower um range for circumference grinding.

According to a further feature of the invention, a high-speed precision clamping device is proposed for implementing the method according to the invention, such a device including a prism-shaped support member which is known per se and forms the first device member, the support member being secured to the frame and being provided with a hydraulically adjustable pressure roller for the radial positioning of the workpiece. The device also includes a driving spindle, head which is known per se and forms the second device member, the driving spindle head being rotatably mounted in the frame and being provided with a collet for clamping the workpiece so as to transfer the torque, and finally the device includes an axial stop member which is known per se and forms the third device member, the stop member being secured to the frame and serving for the axial positioning of the workpiece, wherein the collet, which is displaceably mounted by means of radially acting centering springs in a collet housing secured to the driving spindle head and is rotated via the intermediary of a driver, is drawn into its closed position by means of a collet closing spring and is provided with hollow cone segments on its rear end at both collet arms, the hollow cone segments together forming a hollow cone when the collet is closed, and also wherein a sleeve-like piston is axially displaceably mounted on the axial stop member which is secured to the frame and is engaged by the piston which is hydraulically driven and supports, on its front end, a collet expanding cone corresponding to the hollow cone, and finally wherein a collet compression spring, which presses the collet forwardly, is provided between the piston and the collet and, in addition, a plurality of collet lifting springs are provided between the collet and the collet housing, the springs being disposed at equal angular spacings from one another and pressing the collet rearwardly. By means of a single, compact device which automatically controls the operating sequence, this arrangement of the clamping device permits the positioning and clamping method, which basically comprises three steps, to be implemented just as easily as with known (but disadvantageous) clamping devices, because the machine operator only needs to "insert and clamp" the workpiece, as usual.

A further feature of the invention proposes that the collet lifting springs produce in their entirety a gentle spring action compared with the collet compression spring, while the collet closing spring produces a stronger spring action compared with the collet compression spring. This arrangement permits the multiple-stepped operating sequence to be controlled in an extremely easy manner by adapting the various springs relative to one another.

A further feature of the invention proposes that the axial stop member which is secured to the frame have a fixed, inserted spherical segment—formed from hardened steel and provided with a ground plane surface—at the location where the rear end of the workpiece abuts against the stop member during the axial positioning operation. This arrangmenet permits the axial stop member which is secured to the frame to be subjected only to very slight wear at the location where the rotating workpiece slidingly abuts, thereby ensuring that the high degree of positioning accuracy is maintained for a long time.

A further feature of the invention proposes that slightly protruding hardened steel balls be securely inserted in the front end of the collet which slidingly abuts against the wall of the collet housing during expansion of the collet, the balls establishing the contact with the wall of the collet housing during expansion of the collet. This arrangement permits friction and wear to be kept to a minimum, even between the collet and collet housing, thereby also ensuring that the high degree of positioning accuracy is maintained for a long time.

BRIEF DESCRIPTION OF THE DRAWINGS

The invention is explained more fully hereinafter with reference to the accompanying drawings illustrating one embodiment of the invention, in which:

FIG. 4 is a side elevational view of the prism-shaped support member provided with the pressure roller.

DETAILED DESCRIPTION OF THE PREFERRED EMBODIMENTS

This high-speed precision clamping device is incorporated in a grinding machine frame 1, a few device members being secured to the frame whilst other device members are rotatably mounted and driven.

The purpose of the clamping device is to position a workpiece 2 radially and axially and to clamp the workpiece so that its circumference can be ground.

The clamping device comprises three device members, namely a first device member for the radial positioning of the workpiece 2, a second device member for clamping the workpiece 2, and a third device member for the axial positioning of the workpiece 2. According to the invention, because the tasks of radial positioning, clamping and axial positioning are assigned to three different, though co-operating, device members, the workpiece 2 can be positioned without being adversely affected by the clamping of the same workpiece 2. The consequence is that the workpiece is clamped in a positioning operation which meets particularly high demands for accuracy.

The first device member for radially positioning the workpiece 2 comprises a prism-shaped support member 3 which is secured to the frame and is provided with a pressure roller 4. This arrangement is known per se, but it is new in terms of its co-operation with the other device members.

Figure 1:
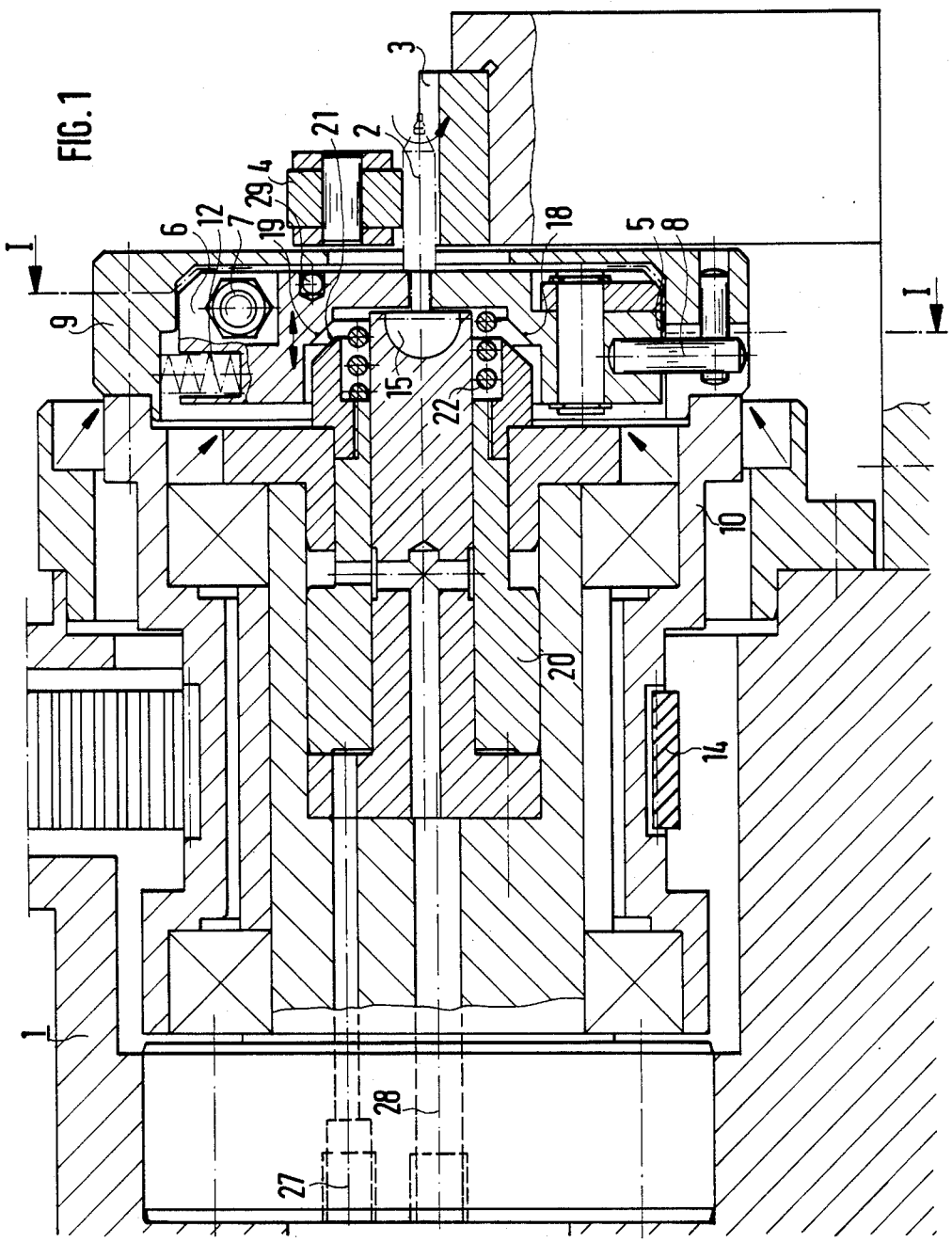
FIG. 1 is a sectional view, taken along the line II—II of FIG. 3, through a high-speed precision clamping device which is also used to explain the method according to the invention.
Figure 2:
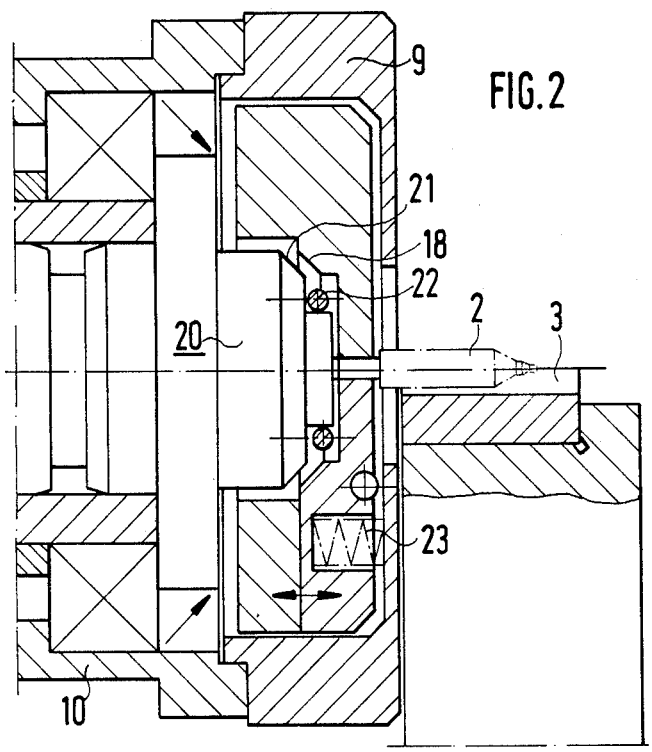
FIG. 2 is a sectional view, taken along the line III—III of FIG. 3, through a portion of the device of FIG. 1, namely through the collet and the collet housing.
Figure 3:
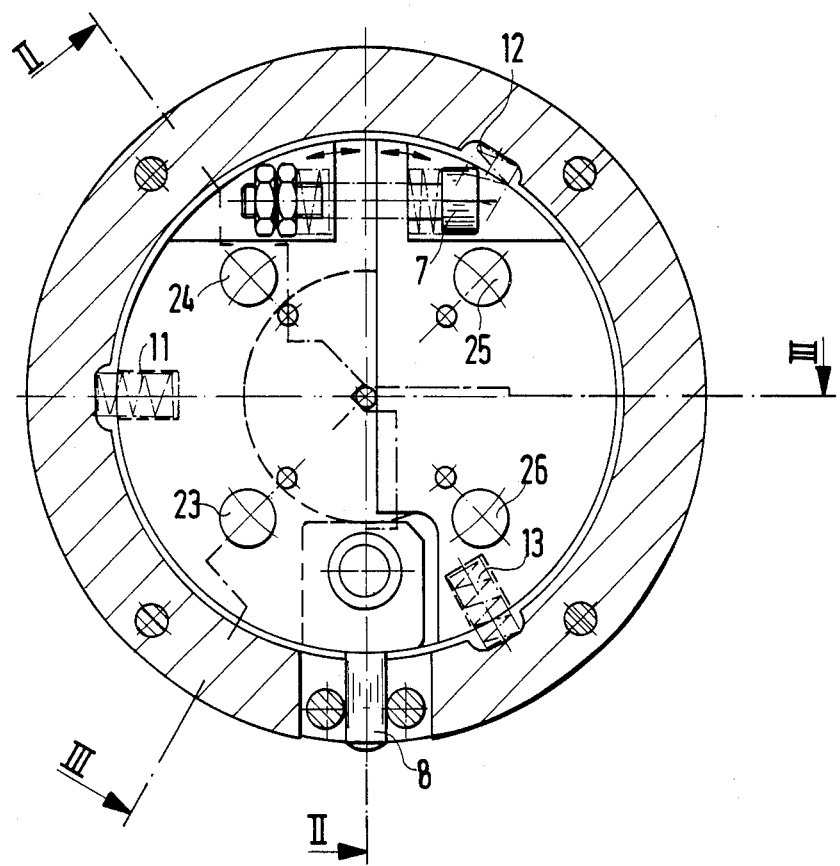
FIG. 3 is a side elevational view of the collet and a longitudinal sectional view through the collet housing taken along the line I—I of FIG. 1.

The second device member for clamping the workpiece 2 largely comprises a collet 5, 6 which is formed from a first collet member 5 and a second collet member 6 which is pivotably mounted on the first collet member. The two collet members 5 and 6 are drawn towards one another, by means of a collet closing spring 7, into the closed position which is shown in FIGS. 1, 2 and 3. In the closed position, the clamping jaws of the collet member 5 and 6 engage with the workpiece 2 so tightly by means of spring pressure that the rotary movement, which is needed for grinding the circumference of the workpiece 2, can be transmitted from the collet 5, 6 to the workpiece 2. Such collets are known per se. However, the collet according to the invention is new in terms of its special structural form and in terms of its co-operation with the other device members. The collet 5, 6 is connected to a collet housing 9 via the intermediary of a driver 8 so as to transfer the rotary force, the collet 5, 6 being displaceably mounted in the collet housing by means of centering springs 11, 12, 13. The collet housing 9 is securely mounted on a driving spindle head 10 which is driven by a drive motor (not shown) via intermediary of the belt 14.

The third device member for axially positioning the workpiece 2 is formed by an axial stop member 15 which is secured to the frame and is also know per se, though it is novel in terms of its co-operation with the other device members.

The clamping method according to the invention now initially comprises radially positioning the workpiece 2 in the first device member by means of the prism-shaped support member 3, which is secured to the frame, and by means of the pressure roller 4. The workpiece 2, which is already radially positioned, is then clamped in the second device member by means of the collet 5, 6 which is displaceably mounted in the centering springs 11, 12, 13. Due to the displaceable mounting of the collet 5, 6, no reaction forces can occur relative to the collet housing 9 during clamping, such forces possibly adversely affecting the position of the collet 5, 6 and hence also the position of the workpiece 2 and its radial positioning. Finally, the workpiece 2, which is already radially positioned and is even already clamped, is also axially positioned by means of axial displacement as far as the axial stop member 15 which is secured to the frame. This terminates the positioning and clamping of the workpiece 2, and the workpiece 2 can start being processed.

In the clamping device, which is shown by way of example in the drawings, the operating sequence according to the invention is automatically controlled by simple, structural means.

For the automatic opening and closing of the first device member for the radial positioning of the workpiece 2, the pressure roller 4 is mounted at one end of a double-ended lever 16, a hydraulic adjusting member 17 engaging with the other end of lever 16 and, after insertion of the workpiece 2 by a control means (not shown) of conventional construction, the adjusting member causes the pressure roller 4 to abut against the workpiece 2 and hence ensures the radial positioning of the workpiece.

For the automatic opening and closing of the second device member for clamping the workpiece 2, the collet 5, 6 is provided at its rear end (remote from the workpiece 2), on both collet members 5 and 6, with hollow cone segments 18 and 19 which form a continuous hollow cone 18, 19 when the collet 5, 6 is closed. A sleeve-like piston 20 is axially displaceably mounted on the axial stop member 15, which is secured to the frame, and piston 20 engages with stop member 15 and supports, at its front end, a collet expanding cone 21 corresponding to the hollow cone 18, 19. A collet compression spring 22 is provided between the piston 20 and the collet 5, 6 and presses the piston 20 and the collet 5, 6 apart, i.e. spring 22 presses the collet 5, 6 forwardly and presses the piston 20 rearwardly. Four collet lifting springs 23, 24, 25 and 26 are also provided between the collet 5, 6 and the collet housing 9 and press the collet 5, 6 rearwardly away from the front wall of the collet housing 9. The piston 20 is a hydraulic piston of known construction which can be advanced through hydraulic conduits 27 and 28 in opposition to the collet compression spring 22 and is moved back by the restoring force of the collet compression spring 22. The hydraulic control means (not shown) is of conventional construction.

The working cycle commences with the hydraulically advancing piston 20. The force exerted upon the collet 5, 6 via the intermediary of the collet compression spring 22 moves the collet 5, 6 forwardly as far as the stop member on the front wall of the collet housing 9 due to compression of the collet lifting springs 23, 24, 25, 26 and subsequently, as the piston 20 advances further, the collet expanding cone 21 of said piston abuts against the hollow cone segments 18, 19, presses segments 18, 19 apart and thereby opens the collet 5, 6 in opposition to the force of the collet closing spring 7. At the same time, the pressure roller 4 is lifted from the prism-shaped support member 3, which is secured to the frame, by the control means (not shown) via the intermediary of the adjusting member 17. In these circumstances, the clamping device is open and ready to have a new workpiece 2 inserted therein.

After insertion of the workpiece 2, the control means (not shown) is activated, for example by pressing a control button, to start the working cycle which now commences.

After the workpiece 2 has been clamped in position in the radial and axial direction, the workpiece is radially positioned as the third process step. The piston 20 is moved back hydraulically; it travels back by the pressure of the collet lifting springs 23, 24, 25, 26 and of the collet compression spring 22. Because this movement also causes the collet expanding cone 21 to travel back, the collet 5, 6 initially closes by the action of the collet closing spring 7 and thereby clamps the workpiece 2 which has already been radially positioned. As the piston 20 travels further back, the collet 5, 6 is lifted from the front wall of the collet housing 9 by the action of the collet lifting springs 23, 24, 25, 26. The collet 5, 6 thereby takes back with it the radially positioned and clamped workpiece 2 until the rear end of the workpiece abuts against the axial stop member 15 which is secured to the frame, the radially positioned and clamped workpiece 2 then being axially positioned also. When the piston 20 has moved back fully, the collet compression spring 22 is entirely relieved of tension. The workpiece 2 may now be processed and may be rotated for this purpose via the intermediary of the belt 14, the driving spindle head 10, the collet housing 9, the driver 8 and the collet 5, 6 without thereby causing the transfer of torque via the radial or axial positioning means. The positioning of the workpiece 2 is not affected by the transfer of torque and is therefore maintained very accurately. The automatic sequence of the method steps is achieved very easily by adapting the various springs to one another when the collet lifting springs 23, 24, 25, 26 produce in their entirety a gentle spring action compared with the collet compression spring 22, while the collet closing spring 7 produces a stronger spring action compared with the collet compression spring 22.

Subsequent to the processing of the workpiece 2, the clamping device is re-opened by the advancing movement of the piston 20, whereby the method steps described for clamping purposes are carried out in the reverse sequence until the working cycle is completed and the clamping device is opened for the removal of the processed workpiece 2.

To reduce sliding friction between the workpiece 2 and the stop member 15 which is secured to the frame, stop member 15 in the region of the contact surface is in the form of an inserted spherical segment which is formed from hardened steel and is ground on its plane surface (this segment can be seen in FIG. 1 but it does not have a special reference numeral).

To reduce the sliding friction between the collet 5, 6 and the front wall of the collet housing 9, hardened steel balls 29 are securely inserted into the front end of the collet 5, 6, balls 29 protuding slightly and establishing contact with the front wall of the collet housing 9. In practical manufacturing use, it has proved easy and economical to insert the steel balls 29 into blind bores and glue them therein.

In the practical embodiments of clamping devices according to the invention, various modifications are possible. The essential feature of the invention is that the device members which are used for clamping purposes are in practical terms independent of the device members which are used for positioning purposes.

I claim:

1. High-speed precision clamping device for clamping a rotationally symmetrical workpiece having an outside circumference to be ground, comprising a grinding machine frame, a first member including a prism-shaped support member secured to the frame and provided with a hydraulically adjustable pressure roller for radially positioning the workpiece, a second member including a driving spindle head rotatably mounted in the frame and provided with a collet having two arms for clamping the workpiece in a manner so as to transfer rotary force, a third member including an axial stop member secured to the frame for axially positioning the workpiece, a collet housing secured to the driving spindle head, radially-acting centering springs for displaceably mounting the collet in the collet housing, a driver for rotating the collet, a collet closing spring for drawing the collet into a closed position, hollow cone segments on both collet arms, said segments together forming a hollow cone when the collet is closed, a hydraulically-driven sleeve-like piston axially displaceably mounted on the axial stop member, a collet expanding cone supported by said piston and corresponding to the hollow cone segments, a collet compression spring for pressing the collet forwardly provided between the piston and the collet and a plurality of collet lifting springs provided between the collet and the collet housing, said collet lifting springs being disposed at equal angular spacings from one another for pressing the collet rearwardly.

2. High-speed precision clamping device according to claim 1, wherein the collet lifting springs in their entirety produce a gentle spring action relative to the collet compression spring, while the collet closing spring produces a stronger spring action relative to the collet compression spring.

3. High-speed precision clamping device according to claim 1, wherein the axial stop member secured to the frame includes a securely-inserted spherical segment formed from hardened steel and having a ground plane surface at a location where a rear end of the workpiece abuts against said axial stop member during axial positioning.

4. High-speed precision clamping device according to claim 1, further including slightly protruding hardened steel balls securely inserted in a front end of the collet for slidingly abutting against a wall of the collet housing during expansion of the collet, said balls providing contact with the wall of the collet housing during expansion of the collet.

* * * * *